G. S. WITHAM, Jr.
TEMPERATURE REGULATOR.
APPLICATION FILED AUG. 1, 1916.
1,378,927.
Patented May 24, 1921.
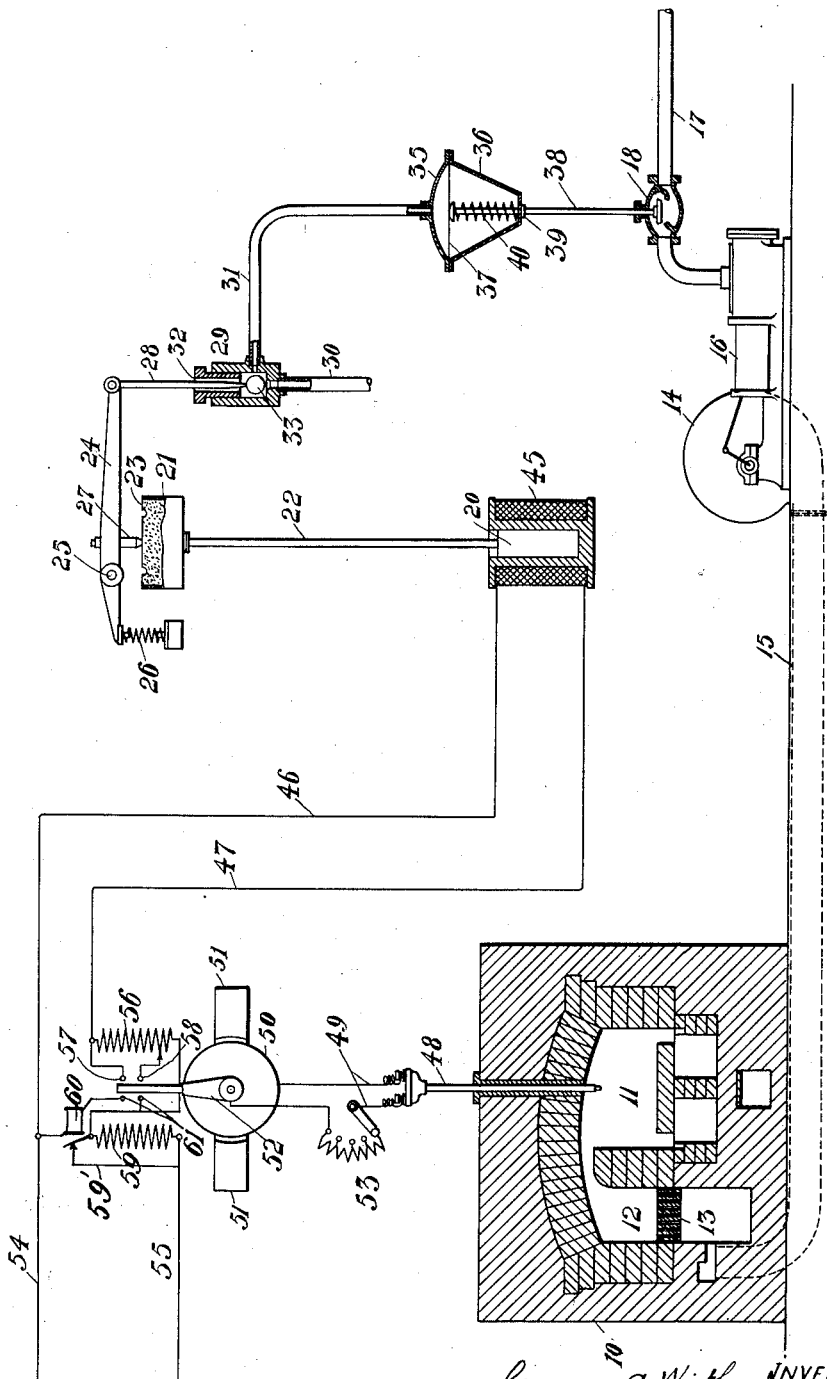

UNITED STATES PATENT OFFICE.

GEORGE S. WITHAM, JR., OF HUDSON FALLS, NEW YORK.

TEMPERATURE-REGULATOR.

1,378,927.

Specification of Letters Patent.

Patented May 24, 1921.

Application filed August 1, 1916. Serial No. 112,481.

*To all whom it may concern:*

Be it known that I, GEORGE S. WITHAM, Jr., a citizen of the United States, residing at Hudson Falls, county of Washington, and State of New York, have invented certain new and useful Improvements in Temperature-Regulators; and I do hereby declare the following to be a full, clear, and exact description of the invention, such as will enable others skilled in the art to which it appertains to make and use the same.

The present invention relates to temperature regulators and more particularly to a system for maintaining substantially constant temperature in a furnace. The invention is especially adapted for use in connection with annealing or similar furnaces in which it is necessary that the temperature be kept within certain limits in order to obtain the most perfect results.

It is the object of the present invention to produce a system of temperature regulation that will accomplish the above result in a comparatively simple manner with the use of a minimum amount of apparatus and yet at the same time permit the required degree of accuracy of regulation to be attained.

Other objects and advantages of the present invention will be made clear by the following detailed description, which is to be taken in conjunction with the accompanying drawing illustrating one embodiment of my invention.

Referring to the drawing 10 represents a furnace having a chamber 11, the temperature of which is to be maintained constant; 12 represents the combustion chamber above a grate 13. The draft through the grate is produced by means of a blower 14 connected to the chamber beneath the grate by a pipe 15. The blower is driven by an engine 16 supplied with steam through a pipe 17 from any convenient source.

In the pipe 17 is a valve 18 for controlling the amount of steam supplied to the engine. The movement of the valve is governed by a thermostatic apparatus comprising a vapor bulb 20 and a capsule 21 connected to the bulb by a tube 22. The capsule is made with a flexible top 23 which advances and recedes with the variations of pressure behind it. The variations of pressure are caused by the expansion or contraction of a volatile liquid which, when vaporized, fills the bulb, tube and capsule. Above the capsule is mounted a transmission lever 24 pivoted at 25. A spring 26 acting at one end of the lever holds an adjusting post 27 in contact with the top of the capsule thus eliminating all lost motion. The other end of the lever is connected by means of a rod 28 to a ball valve 29. The lower port of this valve communicates with an air-supply pipe 30, the side port communicates with the controlled air-line 31, and the upper port 32 through which the rod 28 passes provides leakage from the control space to the atmosphere. The position of the ball 33 regulates the air pressure; when it is tight against the lower port the pressure of the controlled line is zero and when it is against the upper port the leakage is zero and the controlled pressure is equal to that of the supply. Between these two positions the change in pressure is continuous, depending upon the combined action of leakage through the upper port and closing of the lower port. The position of the ball and hence the pressure in the controlled line follows every movement of the lever 24 in response to the expansion and contraction of the vapor capsule.

The controlled air-line 31 communicates with a diaphragm motor which consists of a casing composed of two parts, 35 and 36, between which is clamped a diaphragm 37. The movable part of valve 18 is attached to a rod 38 which passes through a bearing 39 in the bottom of 36 and is normally held against the lower face of the diaphragm by a spring 40. Motion of the diaphragm produced by variations of air pressure in the controlled air-line 31 causes corresponding variations in position of the movable part of valve 18 and consequently controls thereby the supply of steam to the engine.

In order to control the pressure of the vapor within the thermostatic bulb the latter is surrounded by a coil 45. To the terminals of this coil are connected conductors 46 and 47. 48 indicates a thermo-electric pyrometer which may be of any preferred construction and which is inserted through an aperture in the roof of the furnace into the chamber 11. The leads 49 of the pyrometer are connected to the coil 50 of a voltmeter, the coil being pivoted between the poles 51 of a permanent magnet. At one end of the coil 51 is mounted a contact arm 52. An adjusting resistance 53 is inserted in one of the pyrometer leads 49.

The conductor 47 is connected through resistances 56 and 59 to the other supply lead 55. One terminal of resistance 56 is connected to a contact 57 near the arm 52. A companion contact 58 may be connected at any point of the resistance 56 as desired. About the resistance 59 is a short circuit 59' controlled by a relay 60 the circuit of which is established through a pair of contacts 61 when the arm 52 engages therewith.

The operation of the invention is as follows: By means of rheostat 53 the contact arm 52 of the voltmeter is so adjusted that the electromotive force of the pyrometer produced by the predetermined temperature which it is desired shall be maintained in the furnace will cause the arm to lie between the two sets of contacts 57—58 and 61, as shown in Fig. 1. Under these conditions the resistance 59 will be short circuited through 59' and the resistance 56 will be in circuit with the lead 47 running to the coil 45. The heating effect due to the current in the coil will be sufficient to partially vaporize the liquid in the vapor bulb. The vapor capsule will be full of vapor under pressure corresponding to the temperature of the bulb 20. The ball 33 will be held at an intermediate position thus causing the air pressure in the controlled line 31 to be just sufficient to maintain the diaphragm 37 in its normal position. A certain amount of steam will therefore be supplied to the engine and through the latter the blower 14 will be operated to maintain a uniform draft through the combustion chamber of the furnace.

If, due to the continued draft through the furnace, the temperature thereof increases, the increased electromotive force of the pyrometer will cause the coil 50 of the voltmeter to be rotated in a direction to bring the contact arm 52 against the contacts 57 and 58, thereby short circuiting the resistance 56. The increased current that is thus permitted to flow through the coil 45 will increase the vapor pressure and consequently the top of the capsule will be slightly elevated lifting the lever 24 and allowing the ball 33 to close the exhaust port 32. The increased air pressure in the control line 31 will overcome the spring and steam pressures acting against diaphragm 37 and depress the latter, closing the valve 18 and shutting off the steam supply. As soon as the furnace has cooled so that the electromotive force of the pyrometer causes the contact arm 52 to break the short circuit about resistance 56, normal conditions will be established.

If the temperature of the furnace falls due to an insufficient air supply or from any other cause, the decreased electromotive force of the pyrometer will allow the contact arm 52 to travel in a direction to bridge the contacts 61, thus energizing the relay 60 to break the short circuit about the resistance 59 thus causing a diminution in the current flowing through the coil 45 surrounding the vapor bulb. This will decrease the amount of vapor in the latter, causing the top of the capsule 21 to be depressed and the ball valve 31 will be forced down to close the air supply pipe 30. A reduction of pressure above the diaphragm 37 will cause the latter to be curved upward thus opening the valve 18 and allowing more steam to be supplied to the engine to increase the draft through the furnace.

It will thus be seen that the invention provides an arrangement of extreme sensitiveness for controlling the temperature of the furnace and that any tendency to variation from the predetermined temperature is at once corrected by an alteration in the amount of air supplied to the combustion chamber.

I claim:

1. Apparatus for regulating the temperature of the combustion chamber of a furnace comprising, in combination, means for producing a draft through said combustion chamber, means for actuating said draft-producing means, means within the furnace for producing electromotive-forces proportional to the temperatures therein, a bulb containing vapor, a capsule connected to said bulb, means for producing changes of vapor pressure in said capsule in response to changes in electromotive-force produced by said means within the furnace, a controlled air line, a valve in said line adapted to be actuated by the capsule, and means responsive to variations of pressure in said controlled air line for controlling the means for actuating the draft-producing means.

2. Apparatus for regulating the temperature of the combustion chamber for a furnace comprising, in combination, means for producing a draft through said combustion chamber, means for actuating said draft-producing means, a pyrometer within the furnace, a bulb containing vapor, a capsule connected to said bulb, an electrical circuit associated with the bulb for heating the vapor in said bulb in response to changes in electromotive-force produced by said pyrometer, a controlled air line, a valve in said line, mechanism associated with said valve and operatively connected to said capsule for controlling the pressure in said controlled air line in response to variations of vapor pressure in said capsule, and a diaphragm motor connected to said controlled air line and responsive to variations of pressure therein for controlling the means for actuating the draft-producing means.

In testimony whereof I affix my signature.

GEORGE S. WITHAM, Jr.